(No Model.)
J. McINTYRE.
PIPE FITTING.
No. 503,433.　　　　　Patented Aug. 15, 1893.
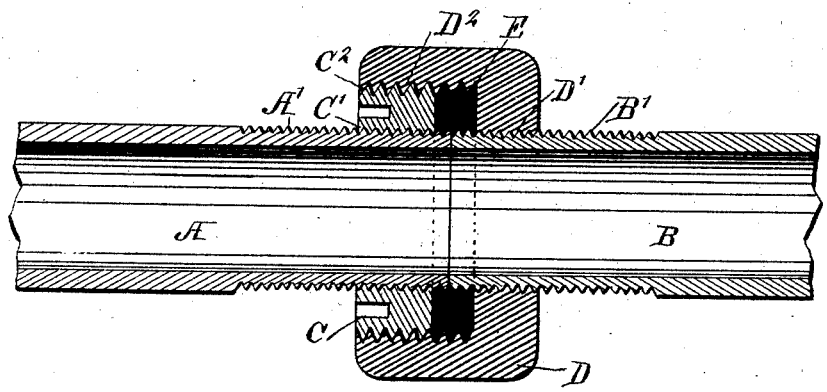
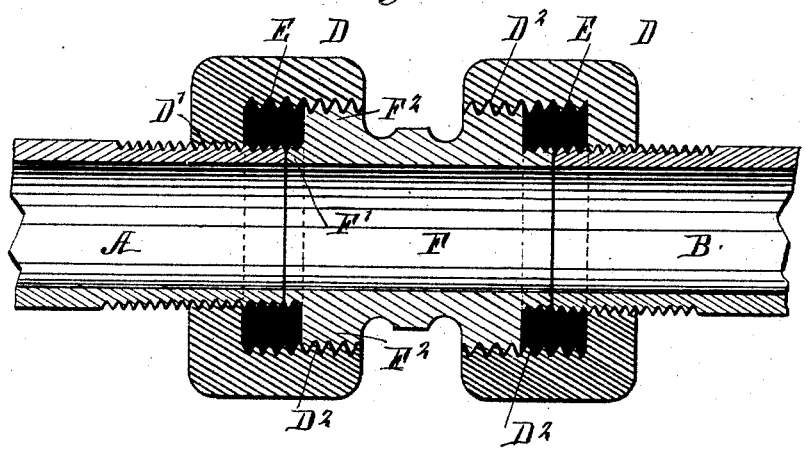
WITNESSES:
Chas Nida
C. Sedgwick
INVENTOR
J. McIntyre
BY
ATTORNEYS.

UNITED STATES PATENT OFFICE.

JOHN McINTYRE, OF JERSEY CITY, NEW JERSEY.

PIPE-FITTING.

SPECIFICATION forming part of Letters Patent No. 503,433, dated August 15, 1893.

Application filed November 8, 1892. Serial No. 451,350. (No model.)

*To all whom it may concern:*

Be it known that I, JOHN McINTYRE, of Jersey City, in the county of Hudson and State of New Jersey, have invented a new and Improved Pipe-Fitting, of which the following is a full, clear, and exact description.

The object of the invention is to provide a new and improved pipe fitting, which is simple and durable in construction, and more especially designed for pipes carrying corrosive fluid, to prevent leakage by the destruction of the threads in the couplings or other pipe fittings.

The invention consists of certain parts and details, and combinations of the same, as will be hereinafter described and then pointed out in the claims.

Reference is to be had to the accompanying drawings, forming a part of this specification, in which similar letters of reference indicate corresponding parts in both the figures.

Figure 1 is a sectional side elevation of the improvement; and Fig. 2 is a similar view of a modified form of the same.

The pipes A and B to be coupled together are formed on their adjacent ends with exterior screw threads $A'$ and $B'$ respectively, of which the thread $A'$ is engaged by a corresponding thread $C'$ formed interiorly on a nut C, provided with an exterior screw thread $C^2$, larger in pitch than the thread $C'$. The exterior screw thread $C^2$ engages a corresponding thread $D^2$ formed interiorly on the nut D provided with a second interior screw thread $D'$ screwing on the thread $B'$ of the pipe B. A packing E in the form of a ring of lead or other suitable compressible material, is placed in the nut D and surrounds the adjacent ends of the pipes A and B at their joints.

In the outer face of the nut C, are formed recesses adapted to be engaged by a suitable wrench or other tool to screw up the said nut or hold it stationary, while screwing up the other nut D on the pipes for the purpose of drawing the pipes toward each other as hereinafter more fully described.

In order to connect the two pipes A and B with each other, the nut C is first screwed into the nut D and then the latter is screwed with its thread $D'$ onto the end of the pipe B after which the pipe A is screwed into the nut C until the two pipes A and B abut one on the other. Now, the operator holds one of the nuts D or C stationary by a suitable tool and turns the other by a wrench or equivalent device, or he turns both nuts simultaneously in opposite directions while the pipes A and B are held stationary, so that the larger engaged screw threads $D^2$, $C^2$ cause the nuts C and D to advance a longer distance toward each other than they can advance on the smaller threads on the pipes A and B, so that the latter are forced farther toward each other and their edges embed one in the other to form a very tight and compact joint through which the fluid cannot penetrate. At the same time the nuts advancing one toward the other compress the packing E so that the latter is firmly pressed onto the exterior of the pipe joint, thus rendering the latter doubly secure against leakage. Fluid passing through the pipes joined and packed in this manner, cannot come in contact at all with the screw threads, so that the latter are not weakened or destroyed by the corrosive action of such fluids and hence the fittings will last for a great length of time. In case a corrosive fluid passing through the pipes A and B, should find a minute recess in the joint and enter the same and eat up the surrounding metal to the exterior surface of the pipes, then the packing will prevent a further advance of the fluid onto the screw threads engaged by the nuts. The latter are screwed up from time to time to force the pipe edges into each other to take up any wear caused by the corrosive action of the fluid.

As illustrated in Fig. 2, a short tube F or other pipe fitting such as a valve, is placed between the adjacent ends of the pipes A and B, and this tube F is provided at its ends with exterior screw threads $F^2$ engaged by the screw threads $D^2$ of two nuts D, one screwing on the pipe A and the other on the pipe B, as will be readily understood by reference to the said Fig. 2. It is understood that when either or both nuts are screwed up, the differential threads cause the pipes A and B to move toward the ends of the tube F, so that the pipe edges embed themselves in the tube edges or faces and a very tight joint is thus made on each face of the said tube F with the respective pipe A or B. The bore of the tube F corresponds to that of the pipe, A and B, so that a continuous bore is had and the fluid can pass through the pipes A and B and tube F without encountering resistance such as is now common in the ordinary pipe fittings forming a space between the adjacent ends of the pipes.

It is understood that in each nut D, a packing E is employed and the tube F is preferably provided at its ends with short offsets F' abutting against the corresponding ends of the pipes A and B, to permit the packing to overlap both the pipe A and the respective offset F'.

Having thus fully described my invention, I claim as new and desire to secure by Letters Patent—

1. A pipe fitting provided with a coupling device comprising two nuts screwing one upon the other and both adapted to screw on the adjacent edges of the pipes to be coupled, the said coupling device forming a simultaneous compressing device and drawing device, the former for compressing the packing and the drawing device for drawing the parts to be coupled toward each other to embed the adjacent edges thereof one in the other to form a tight joint, and a packing ring arranged in the said coupling and adapted to be compressed therein by adjusting the members of the coupling, the compression of the packing ring being exteriorly on the said joint and simultaneous with drawing the edges of the parts to be coupled toward each other, the said packing ring presenting an interior screw thread to the exterior screw threads of the abutting coupled parts, substantially as shown and described.

2. A pipe fitting provided with nuts having differential screw threads and screwing one in the other, and both on the adjacent ends of the pipes, and a packing between the two nuts and pressed in contact with the joint of the pipes when the nuts are screwed up one on the other, substantially as shown and described.

3. A pipe fitting provided with a coupling comprising two nuts having differential screw threads, and screwing one on the other and a packing ring presenting screw threads to threads of the abutting parts to be coupled and to one of the said nuts, substantially as shown and described.

JOHN McINTYRE.

Witnesses:
THEO. G. HOSTER,
C. SEDGWICK.